US012308035B2

(12) United States Patent
Gong et al.

(10) Patent No.: US 12,308,035 B2
(45) Date of Patent: May 20, 2025

(54) SYSTEM AND METHOD FOR SELF-ATTENTION-BASED COMBINING OF MULTICHANNEL SIGNALS FOR SPEECH PROCESSING

(71) Applicant: Microsoft Technology Licensing, LLC, Redmond, WA (US)

(72) Inventors: Rong Gong, Vienna (AT); Carl Benjamin Quillen, Brookline, MA (US); Dushyant Sharma, Mountain House, CA (US); Ljubomir Milanovic, Vienna (AT)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 17/539,451

(22) Filed: Dec. 1, 2021

(65) Prior Publication Data

US 2022/0399026 A1    Dec. 15, 2022

Related U.S. Application Data

(60) Provisional application No. 63/209,746, filed on Jun. 11, 2021.

(51) Int. Cl.
  *G10L 19/008* (2013.01)
  *G10L 25/30* (2013.01)
  *H04R 3/00* (2006.01)

(52) U.S. Cl.
  CPC .......... *G10L 19/008* (2013.01); *G10L 25/30* (2013.01); *H04R 3/005* (2013.01); *H04R 2203/12* (2013.01)

(58) Field of Classification Search
None
See application file for complete search history.

(56) References Cited

U.S. PATENT DOCUMENTS

| 2012/0224702 A1 | 9/2012 | Den et al. |
| 2018/0366122 A1 | 12/2018 | Lee et al. |
| 2019/0043491 A1* | 2/2019 | Kupryjanow ....... G10L 21/0208 |
| 2019/0259409 A1 | 8/2019 | Variani et al. |

(Continued)

FOREIGN PATENT DOCUMENTS

WO    2021013345 A1    1/2021

OTHER PUBLICATIONS

Braun et al., "Multi-channel attention for end-to-end speech recognition", Interspeech 2018 (Year: 2018).*

(Continued)

*Primary Examiner* — Nicole A K Schmieder
(74) *Attorney, Agent, or Firm* — Foley IP Law, PLLC (57) ABSTRACT

A method, computer program product, and computing system for receiving a plurality of signals from a plurality of microphones, thus defining a plurality of channels. A weighted multichannel representation of the plurality of channels may be generated. A plurality of weights for each channel of the plurality of channels may be generated based upon, at least in part, the weighted multichannel representation of the plurality of channels. A single channel representation of the plurality of channels may be generated based upon, at least in part, the weighted multichannel representation of the plurality of channels and the plurality of weights generated for each channel of the plurality of channels.

8 Claims, 6 Drawing Sheets

(56) References Cited

U.S. PATENT DOCUMENTS

2021/0090583 A1   3/2021   Davis

OTHER PUBLICATIONS

Chang et al., "End-to-end multi-channel transformer for speech recognition", ICASSP 2021, pp. 5884-5888, May 13, 2021 (Year: 2021).*
Kumatani et al., "Multi-geometry spatial acoustic modeling for distant speech recognition", ICASSP 2019 (Year: 2019).*
Li et al. "MIMO Self-attentive RNN Beamformer for Multi-speaker Speech Separation", arXiv, Apr. 26, 2021 (Year: 2021).*
"International Search Report and Written Opinion Issued in PCT Application No. PCT/US22/032168", Mailed Date: Sep. 6, 2022, 11 Pages.
Communication pursuant to Rules 70(2) and 70a(2) Received for European Application No. 22820809.6, mailed on Feb. 18, 2025, 1 page.
The Extended European Search Report received for European Application No. 22820809.6, mailed on Jan. 31, 2025, 13 Pages.
Tolooshams, et al., "Channel-Attention Dense U-Net for Multichannel Speech Enchancement", In Proceedings of International Conference on Acoustics, Speech and Signal Processing, May 4, 2020, pp. 836-840.

* cited by examiner

SYSTEM AND METHOD FOR SELF-ATTENTION-BASED COMBINING OF MULTICHANNEL SIGNALS FOR SPEECH PROCESSING

RELATED APPLICATION(S)

This application claims the benefit of the following U.S. Provisional Application No. 63/209,746 filed on 11 Jun. 2021, the contents of which are all incorporated herein by reference.

BACKGROUND

Automated Clinical Documentation (ACD) may be used, e.g., to turn transcribed conversational (e.g., physician, patient, and/or other participants such as patient's family members, nurses, physician assistants, etc.) speech into formatted (e.g., medical) reports. Such reports may be reviewed, e.g., to assure accuracy of the reports by the physician, scribe, etc.

However, speech processing systems (e.g., automatic speech recognition (ASR) systems, biometric voice systems, etc.) suffer recognition accuracy degradation from the input of a far-field speech signal when the speakers are distant from the microphone. The degradation may be due to the signal corruption effect of the far-field speech caused by room reverberation and the background noise. Compared with a single microphone, a microphone array device which comprises multiple microphones can be utilized to capture multichannel audio signal as the input to a speech processing backend system (e.g., an ASR backend system) for alleviating such a degradation problem. However, since a speech processing backend is usually designed to receive a single channel audio input, a speech processing frontend component which receives the multichannel audio and emits a single channel audio may be utilized to bridge the gap between the multichannel audio input and the speech processing backend.

Both speech processing frontend and backend systems require a certain amount of data for neural network model training. During the training, the model parameters may be updated and then the model can be utilized to recognize unseen data. Due to the large parameter size of speech process backend systems, it is more "data hungry" than the speech processing frontend system. In most application scenarios, a larger amount of single channel microphone audio data can be more easily obtained than multichannel microphone array data. Accordingly, a robust speech processing backend system, which receives single channel audio input, may be usually easier to obtain than a robust speech processing system which receives multichannel audio input.

SUMMARY OF DISCLOSURE

In one implementation, a computer-implemented method executed by a computer may include but is not limited to receiving a plurality of signals from a plurality of microphones, thus defining a plurality of channels. A weighted multichannel representation of the plurality of channels may be generated. A plurality of weights for each channel of the plurality of channels may be generated based upon, at least in part, the weighted multichannel representation of the plurality of channels. A single channel representation of the plurality of channels may be generated based upon, at least in part, the weighted multichannel representation of the plurality of channels and the plurality of weights generated for each channel of the plurality of channels.

One or more of the following features may be included. Generating the weighted multichannel representation of the plurality of channels may include generating the weighted multichannel representation of the plurality of channels via a first self-attention machine learning model. Generating the weighted multichannel representation of the plurality of channels via the first self-attention machine learning model may include defining a plurality of attention weights. Generating the weighted multichannel representation of the plurality of channels may include defining each channel of the weighted multichannel representation of the plurality of channels as a linear combination of the plurality of channels. Generating the weighted multichannel representation of the plurality of channels may include generating the weighted multichannel representation of the plurality of channels via one or more fixed beamformers. Generating the plurality of weights for each channel of the plurality of channels based upon, at least in part, the weighted multichannel representation of the plurality of channels may include generating the plurality of weights for each channel of the plurality of channels based upon, at least in part, the weighted multichannel representation of the plurality of channels via a second self-attention machine learning model. The single channel representation of the plurality of channels may be provided to a backend speech processing system.

In another implementation, a computer program product resides on a computer readable medium and has a plurality of instructions stored on it. When executed by a processor, the instructions cause the processor to perform operations including but not limited to receiving a plurality of signals from a plurality of microphones, thus defining a plurality of channels. A weighted multichannel representation of the plurality of channels may be generated. A plurality of weights for each channel of the plurality of channels may be generated based upon, at least in part, the weighted multichannel representation of the plurality of channels. A single channel representation of the plurality of channels may be generated based upon, at least in part, the weighted multichannel representation of the plurality of channels and the plurality of weights generated for each channel of the plurality of channels.

One or more of the following features may be included. Generating the weighted multichannel representation of the plurality of channels may include generating the weighted multichannel representation of the plurality of channels via a first self-attention machine learning model. Generating the weighted multichannel representation of the plurality of channels via the first self-attention machine learning model may include defining a plurality of attention weights. Generating the weighted multichannel representation of the plurality of channels may include defining each channel of the weighted multichannel representation of the plurality of channels as a linear combination of the plurality of channels. Generating the weighted multichannel representation of the plurality of channels may include generating the weighted multichannel representation of the plurality of channels via one or more fixed beamformers. Generating the plurality of weights for each channel of the plurality of channels based upon, at least in part, the weighted multichannel representation of the plurality of channels may include generating the plurality of weights for each channel of the plurality of channels based upon, at least in part, the weighted multichannel representation of the plurality of channels via a second self-attention machine learning model. The single channel representation of the plurality of channels may be provided to a backend speech processing system.

In another implementation, a computing system includes a processor and memory is configured to perform operations including but not limited to, receiving a plurality of signals from a plurality of microphones, thus defining a plurality of channels. The processor may be further configured to generate a weighted multichannel representation of the plurality of channels. The processor may be further configured to generate a plurality of weights for each channel of the plurality of channels based upon, at least in part, the weighted multichannel representation of the plurality of channels. The processor may be further configured to generate a single channel representation of the plurality of channels based upon, at least in part, the weighted multichannel representation of the plurality of channels and the plurality of weights generated for each channel of the plurality of channels.

One or more of the following features may be included. Generating the weighted multichannel representation of the plurality of channels may include generating the weighted multichannel representation of the plurality of channels via a first self-attention machine learning model. Generating the weighted multichannel representation of the plurality of channels via the first self-attention machine learning model may include defining a plurality of attention weights. Generating the weighted multichannel representation of the plurality of channels may include defining each channel of the weighted multichannel representation of the plurality of channels as a linear combination of the plurality of channels. Generating the weighted multichannel representation of the plurality of channels may include generating the weighted multichannel representation of the plurality of channels via one or more fixed beamformers. Generating the plurality of weights for each channel of the plurality of channels based upon, at least in part, the weighted multichannel representation of the plurality of channels may include generating the plurality of weights for each channel of the plurality of channels based upon, at least in part, the weighted multichannel representation of the plurality of channels via a second self-attention machine learning model. The single channel representation of the plurality of channels may be provided to a backend speech processing system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
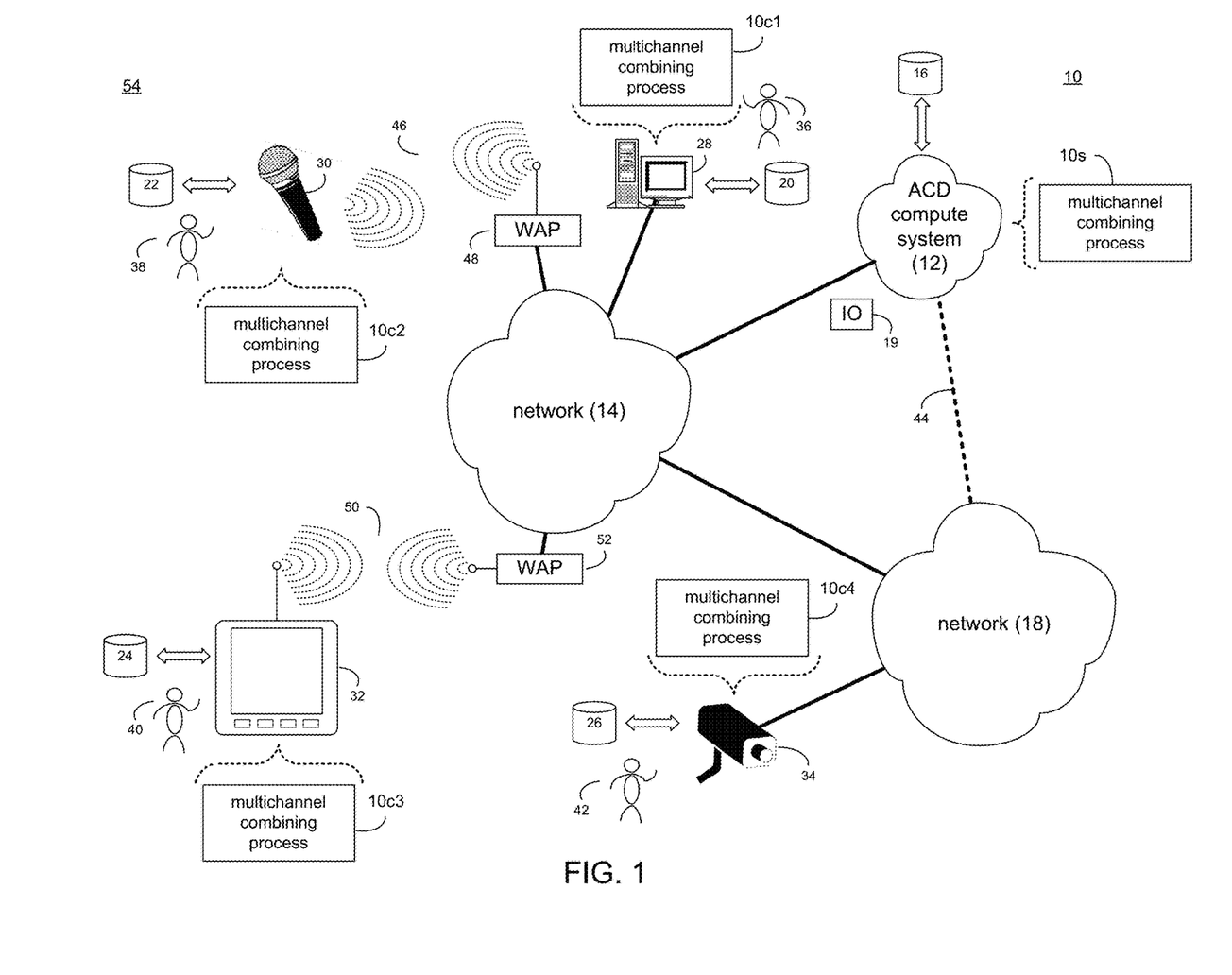
FIG. 1 is a diagrammatic view of an automated clinical documentation computer system and a multichannel combining process coupled to a distributed computing network.

Referring to FIG. 1, there is shown multichannel combining process 10. Multichannel combining process 10 may be implemented as a server-side process, a client-side process, or a hybrid server-side/client-side process. For example, multichannel combining process 10 may be implemented as a purely server-side process via multichannel combining process 10s. Alternatively, multichannel combining process 10 may be implemented as a purely client-side process via one or more of multichannel combining process 10c1, multichannel combining process 10c2, multichannel combining process 10c3, and multichannel combining process 10c4. Alternatively still, multichannel combining process 10 may be implemented as a hybrid server-side/client-side process via multichannel combining process 10s in combination with one or more of multichannel combining process 10c1, multichannel combining process 10c2, multichannel combining process 10c3, and multichannel combining process 10c4.

Accordingly, multichannel combining process 10 as used in this disclosure may include any combination of multichannel combining process 10s, multichannel combining process 10c1, multichannel combining process 10c2, multichannel combining process 10c3, and multichannel combining process 10c4.

Multichannel combining process 10s may be a server application and may reside on and may be executed by automated clinical documentation (ACD) computer system 12, which may be connected to network 14 (e.g., the Internet or a local area network). ACD computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

As is known in the art, a SAN may include one or more of a personal computer, a server computer, a series of server computers, a mini computer, a mainframe computer, a RAID device and a NAS system. The various components of ACD computer system 12 may execute one or more operating systems, examples of which may include but are not limited to: Microsoft Windows Server™; Redhat Linux™, Unix, or a custom operating system, for example.

The instruction sets and subroutines of multichannel combining process 10s, which may be stored on storage device 16 coupled to ACD computer system 12, may be executed by one or more processors (not shown) and one or more memory architectures (not shown) included within ACD computer system 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 19) may be sent from multichannel combining process 10s, multichannel combining process 10c1, multichannel combining process 10c2, multichannel combining process 10c3 and/or multichannel combining process 10c4 to ACD computer system 12. Examples of IO request 19 may include but are not limited to data write requests (i.e. a request that content be written to ACD computer system 12) and data read requests (i.e. a request that content be read from ACD computer system 12).

The instruction sets and subroutines of multichannel combining process 10c1, multichannel combining process 10c2, multichannel combining process 10c3 and/or multichannel combining process 10c4, which may be stored on storage devices 20, 22, 24, 26 (respectively) coupled to ACD client electronic devices 28, 30, 32, 34 (respectively), may be executed by one or more processors (not shown) and one or more memory architectures (not shown) incorporated into ACD client electronic devices 28, 30, 32, 34 (respectively). Storage devices 20, 22, 24, 26 may include but are not limited to: hard disk drives; optical drives; RAID devices; random access memories (RAM); read-only memories (ROM), and all forms of flash memory storage devices. Examples of ACD client electronic devices 28, 30, 32, 34 may include, but are not limited to, personal computing device 28 (e.g., a smart phone, a personal digital assistant, a laptop computer, a notebook computer, and a desktop computer), audio input device 30 (e.g., a handheld microphone, a lapel microphone, an embedded microphone (such as those embedded within eyeglasses, smart phones, tablet computers and/or watches) and an audio recording device), display device 32 (e.g., a tablet computer, a computer monitor, and a smart television), machine vision input device 34 (e.g., an RGB imaging system, an infrared imaging system, an ultraviolet imaging system, a laser imaging system, a SONAR imaging system, a RADAR imaging system, and a thermal imaging system), a hybrid device (e.g., a single device that includes the functionality of one or more of the above-references devices; not shown), an audio rendering device (e.g., a speaker system, a headphone system, or an earbud system; not shown), various medical devices (e.g., medical imaging equipment, heart monitoring machines, body weight scales, body temperature thermometers, and blood pressure machines; not shown), and a dedicated network device (not shown).

Users 36, 38, 40, 42 may access ACD computer system 12 directly through network 14 or through secondary network 18. Further, ACD computer system 12 may be connected to network 14 through secondary network 18, as illustrated with link line 44.

The various ACD client electronic devices (e.g., ACD client electronic devices 28, 30, 32, 34) may be directly or indirectly coupled to network 14 (or network 18). For example, personal computing device 28 is shown directly coupled to network 14 via a hardwired network connection. Further, machine vision input device 34 is shown directly coupled to network 18 via a hardwired network connection. Audio input device 30 is shown wirelessly coupled to network 14 via wireless communication channel 46 established between audio input device 30 and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between audio input device 30 and WAP 48. Display device 32 is shown wirelessly coupled to network 14 via wireless communication channel 50 established between display device 32 and WAP 52, which is shown directly coupled to network 14.

The various ACD client electronic devices (e.g., ACD client electronic devices 28, 30, 32, 34) may each execute an operating system, examples of which may include but are not limited to Microsoft Windows™, Apple Macintosh™, Redhat Linux™, or a custom operating system, wherein the combination of the various ACD client electronic devices (e.g., ACD client electronic devices 28, 30, 32, 34) and ACD computer system 12 may form modular ACD system 54.

Figure 2:
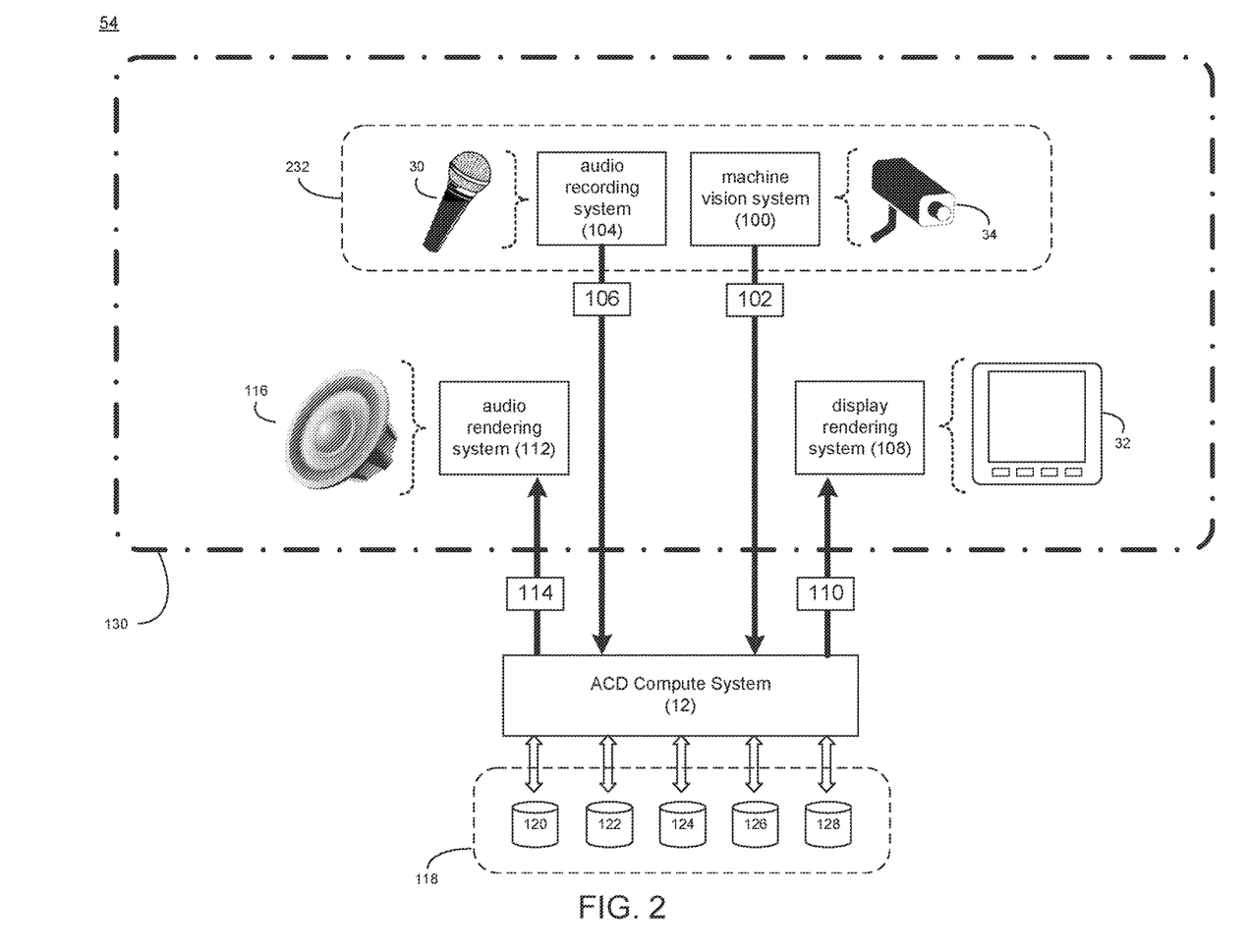
FIG. 2 is a diagrammatic view of a modular ACD system incorporating the automated clinical documentation computer system of FIG. 1.

Referring also to FIG. 2, there is shown a simplified example embodiment of modular ACD system 54 that is configured to automate clinical documentation. Modular ACD system 54 may include: machine vision system 100 configured to obtain machine vision encounter information 102 concerning a patient encounter; audio recording system 104 configured to obtain audio encounter information 106 concerning the patient encounter; and a computer system (e.g., ACD computer system 12) configured to receive machine vision encounter information 102 and audio encounter information 106 from machine vision system 100 and audio recording system 104 (respectively). Modular ACD system 54 may also include: display rendering system 108 configured to render visual information 110; and audio rendering system 112 configured to render audio information 114, wherein ACD computer system 12 may be configured to provide visual information 110 and audio information 114 to display rendering system 108 and audio rendering system 112 (respectively).

Example of machine vision system 100 may include but are not limited to: one or more ACD client electronic devices (e.g., ACD client electronic device 34, examples of which may include but are not limited to an RGB imaging system, an infrared imaging system, a ultraviolet imaging system, a laser imaging system, a SONAR imaging system, a RADAR imaging system, and a thermal imaging system). Examples of audio recording system 104 may include but are not limited to: one or more ACD client electronic devices (e.g., ACD client electronic device 30, examples of which may include but are not limited to a handheld microphone, a lapel microphone, an embedded microphone (such as those embedded within eyeglasses, smart phones, tablet computers and/or watches) and an audio recording device). Examples of display rendering system 108 may include but are not limited to: one or more ACD client electronic devices (e.g., ACD client electronic device 32, examples of which may include but are not limited to a tablet computer, a computer monitor, and a smart television). Examples of audio rendering system 112 may include but are not limited to: one or more ACD client electronic devices (e.g., audio rendering device 116, examples of which may include but are not limited to a speaker system, a headphone system, and an earbud system).

As will be discussed below in greater detail, ACD computer system 12 may be configured to access one or more datasources 118 (e.g., plurality of individual datasources 120, 122, 124, 126, 128), examples of which may include but are not limited to one or more of a user profile datasource, a voice print datasource, a voice characteristics datasource (e.g., for adapting the automated speech recognition models), a face print datasource, a humanoid shape datasource, an utterance identifier datasource, a wearable token identifier datasource, an interaction identifier datasource, a medical conditions symptoms datasource, a prescriptions compatibility datasource, a medical insurance coverage datasource, and a home healthcare datasource.

While in this particular example, five different examples of datasources 118, are shown, this is for illustrative purposes only and is not intended to be a limitation of this disclosure, as other configurations are possible and are considered to be within the scope of this disclosure.

As will be discussed below in greater detail, modular ACD system 54 may be configured to monitor a monitored space (e.g., monitored space 130) in a clinical environment, wherein examples of this clinical environment may include but are not limited to: a doctor's office, a medical facility, a medical practice, a medical lab, an urgent care facility, a medical clinic, an emergency room, an operating room, a hospital, a long term care facility, a rehabilitation facility, a nursing home, and a hospice facility. Accordingly, an example of the above-referenced patient encounter may include but is not limited to a patient visiting one or more of the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility).

Machine vision system 100 may include a plurality of discrete machine vision systems when the above-described clinical environment is larger or a higher level of resolution is desired. As discussed above, examples of machine vision system 100 may include but are not limited to: one or more ACD client electronic devices (e.g., ACD client electronic device 34, examples of which may include but are not limited to an RGB imaging system, an infrared imaging system, an ultraviolet imaging system, a laser imaging system, a SONAR imaging system, a RADAR imaging system, and a thermal imaging system). Accordingly, machine vision system 100 may include one or more of each of an RGB imaging system, an infrared imaging systems, an ultraviolet imaging systems, a laser imaging system, a SONAR imaging system, a RADAR imaging system, and a thermal imaging system.

Audio recording system 104 may include a plurality of discrete audio recording systems when the above-described clinical environment is larger or a higher level of resolution is desired. As discussed above, examples of audio recording system 104 may include but are not limited to: one or more ACD client electronic devices (e.g., ACD client electronic device 30, examples of which may include but are not limited to a handheld microphone, a lapel microphone, an embedded microphone (such as those embedded within eyeglasses, smart phones, tablet computers and/or watches) and an audio recording device). Accordingly, audio recording system 104 may include one or more of each of a handheld microphone, a lapel microphone, an embedded microphone (such as those embedded within eyeglasses, smart phones, tablet computers and/or watches) and an audio recording device.

Display rendering system 108 may include a plurality of discrete display rendering systems when the above-described clinical environment is larger or a higher level of resolution is desired. As discussed above, examples of display rendering system 108 may include but are not limited to: one or more ACD client electronic devices (e.g., ACD client electronic device 32, examples of which may include but are not limited to a tablet computer, a computer monitor, and a smart television). Accordingly, display rendering system 108 may include one or more of each of a tablet computer, a computer monitor, and a smart television.

Audio rendering system 112 may include a plurality of discrete audio rendering systems when the above-described clinical environment is larger or a higher level of resolution is desired. As discussed above, examples of audio rendering system 112 may include but are not limited to: one or more ACD client electronic devices (e.g., audio rendering device 116, examples of which may include but are not limited to a speaker system, a headphone system, or an earbud system). Accordingly, audio rendering system 112 may include one or more of each of a speaker system, a headphone system, or an earbud system.

ACD computer system 12 may include a plurality of discrete computer systems. As discussed above, ACD computer system 12 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform. Accordingly, ACD computer system 12 may include one or more of each of a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

Figure 3:
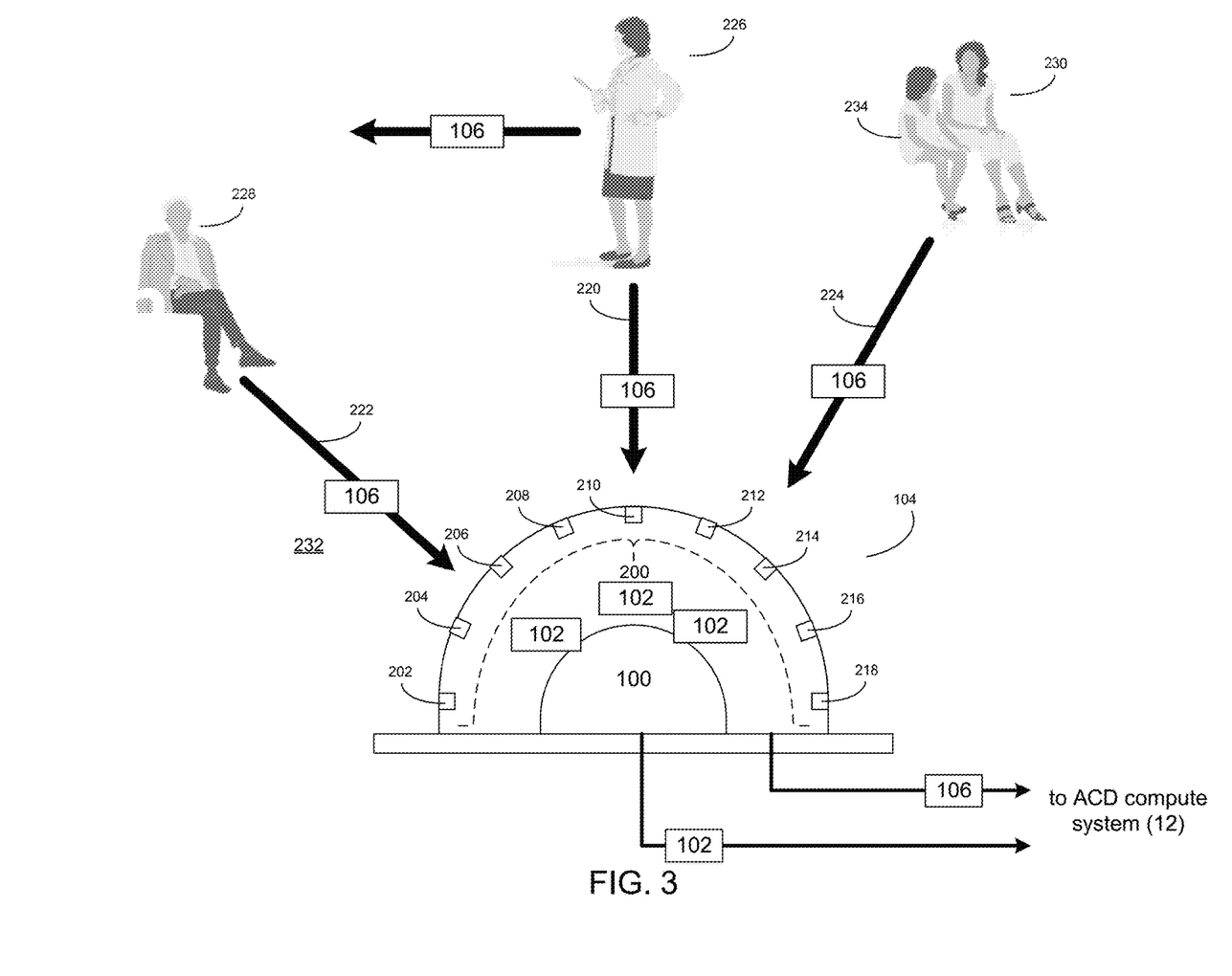
FIG. 3 is a diagrammatic view of a mixed-media ACD device included within the modular ACD system of FIG. 2.

Referring also to FIG. 3, audio recording system 104 may include directional microphone array 200 having a plurality of discrete microphone assemblies. For example, audio recording system 104 may include a plurality of discrete audio acquisition devices (e.g., audio acquisition devices 202, 204, 206, 208, 210, 212, 214, 216, 218) that may form microphone array 200. As will be discussed below in greater detail, modular ACD system 54 may be configured to form one or more audio recording beams (e.g., audio recording beams 220, 222, 224) via the discrete audio acquisition devices (e.g., audio acquisition devices 202, 204, 206, 208, 210, 212, 214, 216, 218) included within audio recording system 104.

For example, modular ACD system 54 may be further configured to steer the one or more audio recording beams (e.g., audio recording beams 220, 222, 224) toward one or more encounter participants (e.g., encounter participants 226, 228, 230) of the above-described patient encounter. Examples of the encounter participants (e.g., encounter participants 226, 228, 230) may include but are not limited to: medical professionals (e.g., doctors, nurses, physician's assistants, lab technicians, physical therapists, scribes (e.g., a transcriptionist) and/or staff members involved in the patient encounter), patients (e.g., people that are visiting the above-described clinical environments for the patient encounter), and third parties (e.g., friends of the patient, relatives of the patient and/or acquaintances of the patient that are involved in the patient encounter).

Accordingly, modular ACD system 54 and/or audio recording system 104 may be configured to utilize one or more of the discrete audio acquisition devices (e.g., audio acquisition devices 202, 204, 206, 208, 210, 212, 214, 216, 218) to form an audio recording beam. For example, modular ACD system 54 and/or audio recording system 104 may be configured to utilize audio acquisition device 210 to form audio recording beam 220, thus enabling the capturing of audio (e.g., speech) produced by encounter participant 226

(as audio acquisition device 210 is pointed to (i.e., directed toward) encounter participant 226). Additionally, modular ACD system 54 and/or audio recording system 104 may be configured to utilize audio acquisition devices 204, 206 to form audio recording beam 222, thus enabling the capturing of audio (e.g., speech) produced by encounter participant 228 (as audio acquisition devices 204, 206 are pointed to (i.e., directed toward) encounter participant 228). Additionally, modular ACD system 54 and/or audio recording system 104 may be configured to utilize audio acquisition devices 212, 214 to form audio recording beam 224, thus enabling the capturing of audio (e.g., speech) produced by encounter participant 230 (as audio acquisition devices 212, 214 are pointed to (i.e., directed toward) encounter participant 230). Further, modular ACD system 54 and/or audio recording system 104 may be configured to utilize null-steering precoding to cancel interference between speakers and/or noise.

As is known in the art, null-steering precoding is a method of spatial signal processing by which a multiple antenna transmitter may null multiuser interference signals in wireless communications, wherein null-steering precoding may mitigate the impact off background noise and unknown user interference.

In particular, null-steering precoding may be a method of beamforming for narrowband signals that may compensate for delays of receiving signals from a specific source at different elements of an antenna array. In general and to improve performance of the antenna array, in incoming signals may be summed and averaged, wherein certain signals may be weighted and compensation may be made for signal delays.

Machine vision system 100 and audio recording system 104 may be stand-alone devices (as shown in FIG. 2). Additionally/alternatively, machine vision system 100 and audio recording system 104 may be combined into one package to form mixed-media ACD device 232. For example, mixed-media ACD device 232 may be configured to be mounted to a structure (e.g., a wall, a ceiling, a beam, a column) within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility), thus allowing for easy installation of the same. Further, modular ACD system 54 may be configured to include a plurality of mixed-media ACD devices (e.g., mixed-media ACD device 232) when the above-described clinical environment is larger or a higher level of resolution is desired.

Modular ACD system 54 may be further configured to steer the one or more audio recording beams (e.g., audio recording beams 220, 222, 224) toward one or more encounter participants (e.g., encounter participants 226, 228, 230) of the patient encounter based, at least in part, upon machine vision encounter information 102. As discussed above, mixed-media ACD device 232 (and machine vision system 100/audio recording system 104 included therein) may be configured to monitor one or more encounter participants (e.g., encounter participants 226, 228, 230) of a patient encounter.

Specifically, machine vision system 100 (either as a stand-alone system or as a component of mixed-media ACD device 232) may be configured to detect humanoid shapes within the above-described clinical environments (e.g., a doctor's office, a medical facility, a medical practice, a medical lab, an urgent care facility, a medical clinic, an emergency room, an operating room, a hospital, a long term care facility, a rehabilitation facility, a nursing home, and a hospice facility). And when these humanoid shapes are detected by machine vision system 100, modular ACD system 54 and/or audio recording system 104 may be configured to utilize one or more of the discrete audio acquisition devices (e.g., audio acquisition devices 202, 204, 206, 208, 210, 212, 214, 216, 218) to form an audio recording beam (e.g., audio recording beams 220, 222, 224) that is directed toward each of the detected humanoid shapes (e.g., encounter participants 226, 228, 230).

As discussed above, ACD computer system 12 may be configured to receive machine vision encounter information 102 and audio encounter information 106 from machine vision system 100 and audio recording system 104 (respectively); and may be configured to provide visual information 110 and audio information 114 to display rendering system 108 and audio rendering system 112 (respectively). Depending upon the manner in which modular ACD system 54 (and/or mixed-media ACD device 232) is configured, ACD computer system 12 may be included within mixed-media ACD device 232 or external to mixed-media ACD device 232.

As discussed above, ACD computer system 12 may execute all or a portion of multichannel combining process 10, wherein the instruction sets and subroutines of multichannel combining process 10 (which may be stored on one or more of e.g., storage devices 16, 20, 22, 24, 26) may be executed by ACD computer system 12 and/or one or more of ACD client electronic devices 28, 30, 32, 34.

Figure 4:
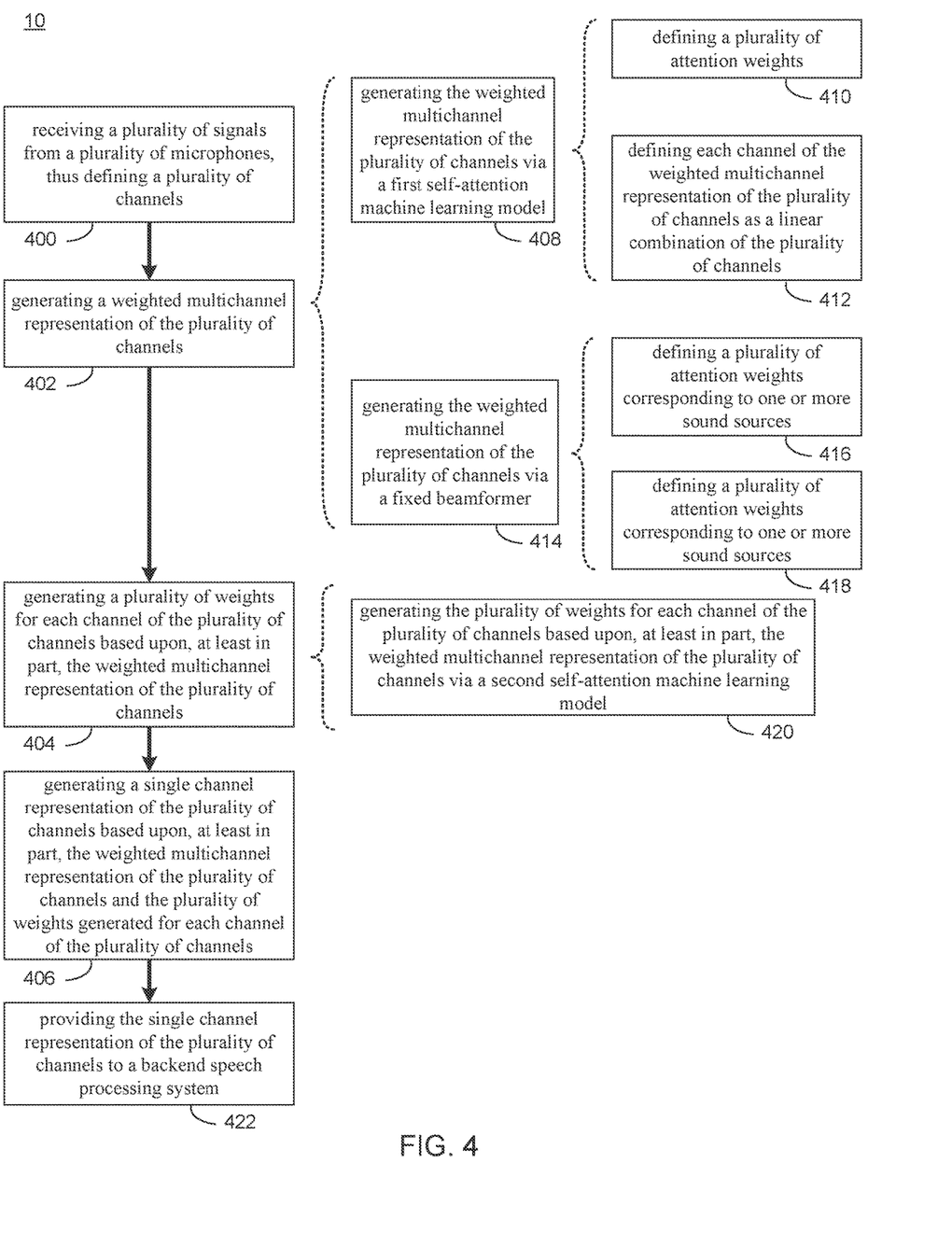
FIG. 4 is a flow chart of one implementation of the multichannel combining process of FIG. 1.

The Multichannel Combining Process:

As discussed above and referring also at least to FIGS. 4-6, multichannel combining process 10 may receive 400 a plurality of signals from a plurality of microphones, thus defining a plurality of channels. A weighted multichannel representation of the plurality of channels may be generated 402. A plurality of weights for each channel of the plurality of channels may be generated 404 based upon, at least in part, the weighted multichannel representation of the plurality of channels. A single channel representation of the plurality of channels may be generated 406 based upon, at least in part, the weighted multichannel representation of the plurality of channels and the plurality of weights generated for each channel of the plurality of channels.

In some implementations consistent with the present disclosure, systems and methods may be provided for a self-attention-based neural network speech processing frontend system designed to increase the far-field speech recognition accuracy by leveraging multichannel audio captured by a microphone array. For example, speech processing systems (e.g., automatic speech recognition (ASR) systems, biometric voice systems, etc.) suffer recognition accuracy degradation from the input of a far-field speech signal when the speakers are distant from the microphone. The degradation may be due to the signal corruption effect of the far-field speech caused by room reverberation and the background noise.

Compared with a single microphone, a microphone array device which comprises multiple microphones can be utilized to capture multichannel audio signal as the input to a speech processing backend system (e.g., an ASR backend system) for alleviating such a degradation problem. However, since conventional backend speech processing systems are usually designed to receive a single channel audio input, a frontend speech processing system which receives the multichannel audio and emits a single channel audio may be utilized to bridge the gap between the multichannel audio input and the backend speech processing system.

Both frontend and backend speech processing systems require a certain amount of data for neural network model training. During the training, the model parameters may be updated and then the model can be utilized to recognize unseen data. Due to the large parameter size of backend speech process systems, it is more "data hungry" than frontend speech processing systems. In most application scenarios, a larger amount of single channel microphone audio data can be more easily obtained than multichannel microphone array data. Accordingly, a robust backend speech processing system, which receives single channel audio input, may be easier to obtain than a robust speech processing system which receives multichannel audio input. To address this multichannel data scarcity problem, the frontend speech processing system described herein may be designed in a manner that is compatible with any common backend speech processing system design. Accordingly, it may be jointly fine-tuned with a pre-trained backend speech processing system with a significantly less amount of multichannel data.

As will be discussed in greater detail below, implementations of the present disclosure provide a neural network architecture design for a multichannel frontend speech processing system that does not require any modifications to the existing, conventional single channel input backend speech processing systems. Accordingly, with a small amount of multichannel training data, a well-trained backend speech processing system may be augmented to receive far-field multichannel input. Implementations of the present disclosure provide a frontend design that shows improved recognition accuracy (or reduced word error rate) compared with conventional approaches to speech processing.

Figure 5:
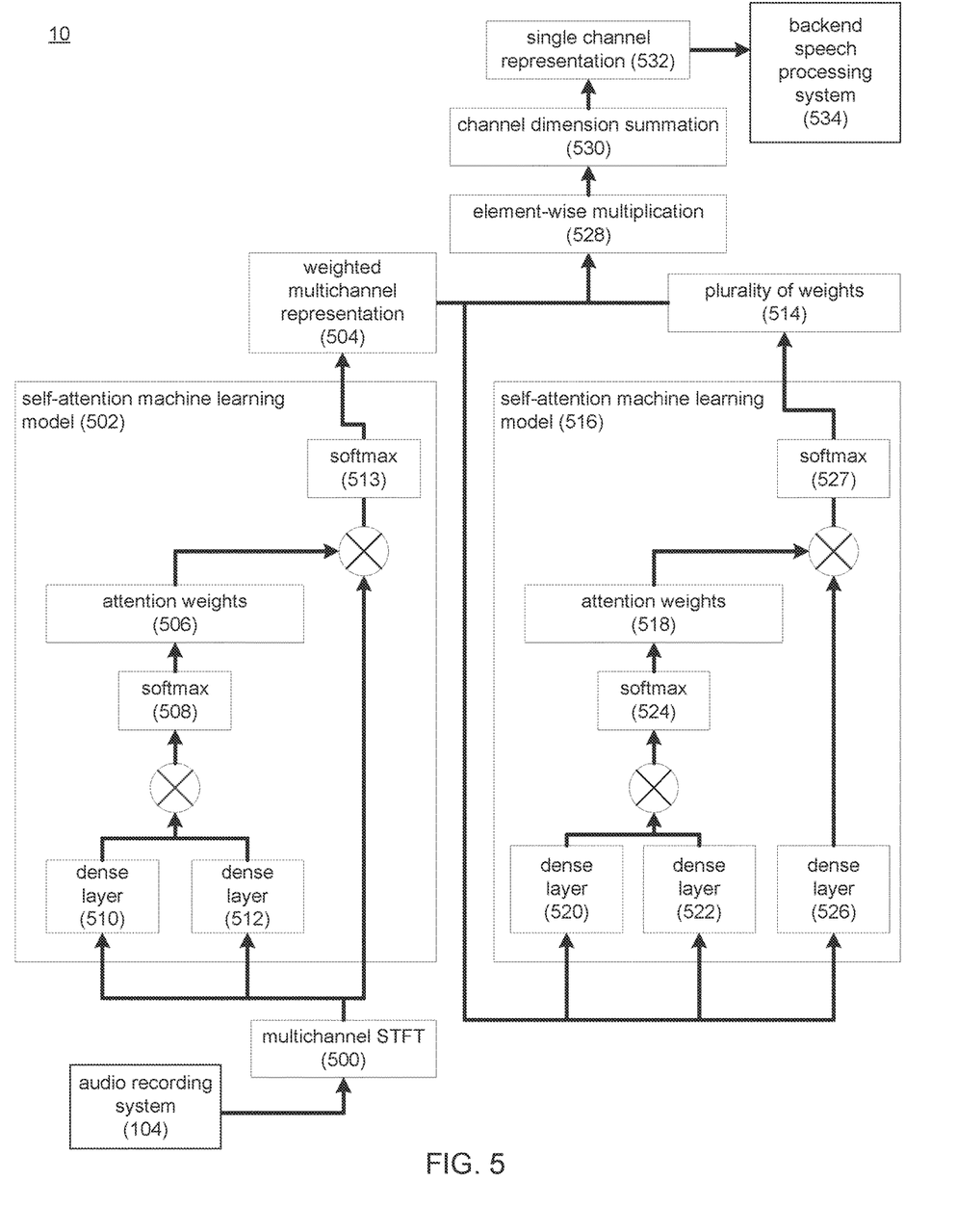
FIGS. 5-6 are diagrammatic views of various frontend speech processing systems according to various implementations of the multichannel combining process of FIG. 1.

In some implementations, multichannel combining process 10 may receive 400 a plurality of signals from a plurality of microphones, thus defining a plurality of channels. Referring also to FIG. 5, multichannel combining process 10 may receive from a plurality of microphones (e.g., audio recording system 104 including plurality of microphones 202, 204, 206, 208, 210, 212, 214, 216, 218) to define a plurality of channels. In some implementations, multichannel combining process 10 may perform a Short Time Fourier Transform (STFT) of the plurality of channels (e.g., represented in FIG. 5 as block 500) to define a magnitude representation of the plurality of channels. However, it will be appreciated that multichannel combining process 10 may perform any preliminary signal processing in addition to, and/or instead of, STFT within the scope of the present disclosure. Alternatively and as will be discussed in greater detail below, multichannel combining process 10 may not perform any preliminary signal processing of the plurality of channels.

In some implementations, multichannel combining process 10 may generate 402 a weighted multichannel representation of the plurality of channels. As will be discussed in greater detail below, multichannel combining process 10 may alter the distribution of the magnitude and/or phase components of the plurality of channels to generate 402 a weighted multichannel representation based on how important or meaningful various portions of the plurality of channels are for signal processing purposes. For example, the weighted multichannel representation may weight particular portions (e.g., frequency magnitude and/or phase components) of the plurality of channels based upon, at least in part, the importance of the portions of the plurality of channels to the signal processing system.

In some implementations, generating 402 the weighted multichannel representation of the plurality of channels may include generating 408 the weighted multichannel representation of the plurality of channels via a first self-attention machine learning model. As is known in the art, self-attention is an attention mechanism relating different positions of a single sequence or signal in order to compute a representation of the same sequence or signal. Attention mechanisms define "important" portions of one or more sequences or signals relative to other portions of the sequence(s) or signal(s). In the context of a multichannel representation of the plurality of channels, self-attention may define the plurality of channels in terms of channels or portions of channels that are more important for speech processing and portions that are less important for speech processing. For example, the weighted multichannel representation may indicate which portions of a signals across a plurality of channels are important for speech processing and which portions of the signals not to focus on. In this manner, the various speech signals received by the plurality of microphones of a microphone array may be processed at the front end into a single channel representation that emphasizes the portions of the signals that are most important for speech processing.

Referring also to FIG. 5, multichannel combining process 10 may receive 400 a plurality of signals from a plurality of microphones (e.g., audio recording system 104 including plurality of microphones 202, 204, 206, 208, 210, 212, 214, 216, 218) to define a plurality of channels. As discussed above, multichannel combining process 10 may perform preliminary signal processing on the plurality of channels to generate a multichannel STFT representation of the plurality of channels (e.g., represented as block 500 of FIG. 5). Multichannel combining process 10 may generate 402 a weighted multichannel representation of the plurality of channels using a first self-attention machine learning model (e.g., self-attention machine learning model 502).

In some implementations, generating 408 the weighted multichannel representation of the plurality of channels via the first self-attention machine learning model may include defining 410 a plurality of attention weights. For example, self-attention machine learning model 502 may receive 400 the multichannel STFT magnitude as an input and generate 402 a weighted multichannel representation as the output (e.g., weighted multichannel representation 504). Generating 402 the weighted multichannel representation may include defining 410 a plurality of attention weights (e.g., plurality of attention weights 506) by a softmax of the tensor multiplication between the "query" and "key" (e.g., represented by block 508 of FIG. 5) and by performing a softmax of the product of the plurality of attention weights (e.g., plurality of attention weights 506) and the multichannel STFT (e.g., multichannel STFT 500) (e.g., represented by block 513 of FIG. 5). As is known in the art within the context of self-attention, a query may generally include or represent the information to search for and a key may generally include or represent the relevance to the query. The query and key may be calculated separately by performing linear transformations on the STFT input. As shown in FIG. 5, two "dense" layers (e.g., dense layers 510, 512) may be neural network components for performing linear transformations to calculate the query (e.g., dense layer 510) and to calculate the key (e.g., via dense layer 512).

In some implementations, generating 408 the weighted multichannel representation of the plurality of channels may include defining 412 each channel of the weighted multichannel representation of the plurality of channels as a linear combination of the plurality of channels. With the plurality of attention weights (e.g., plurality of attention weights 506), multichannel combining process 10 may generate the weighted multichannel representation of the plurality of channels via the first self-attention machine learning model by multiplying the plurality of attention weights by the plurality of channels. In this manner, each channel in the weighted multichannel representation (e.g., weighted multichannel representation 504) is the weighted sum of the input channels (e.g., the plurality of channels). Accordingly, the weighted multichannel representation (e.g., weighted multichannel representation 504) may be a linear combination of the plurality of channels.

Figure 6:
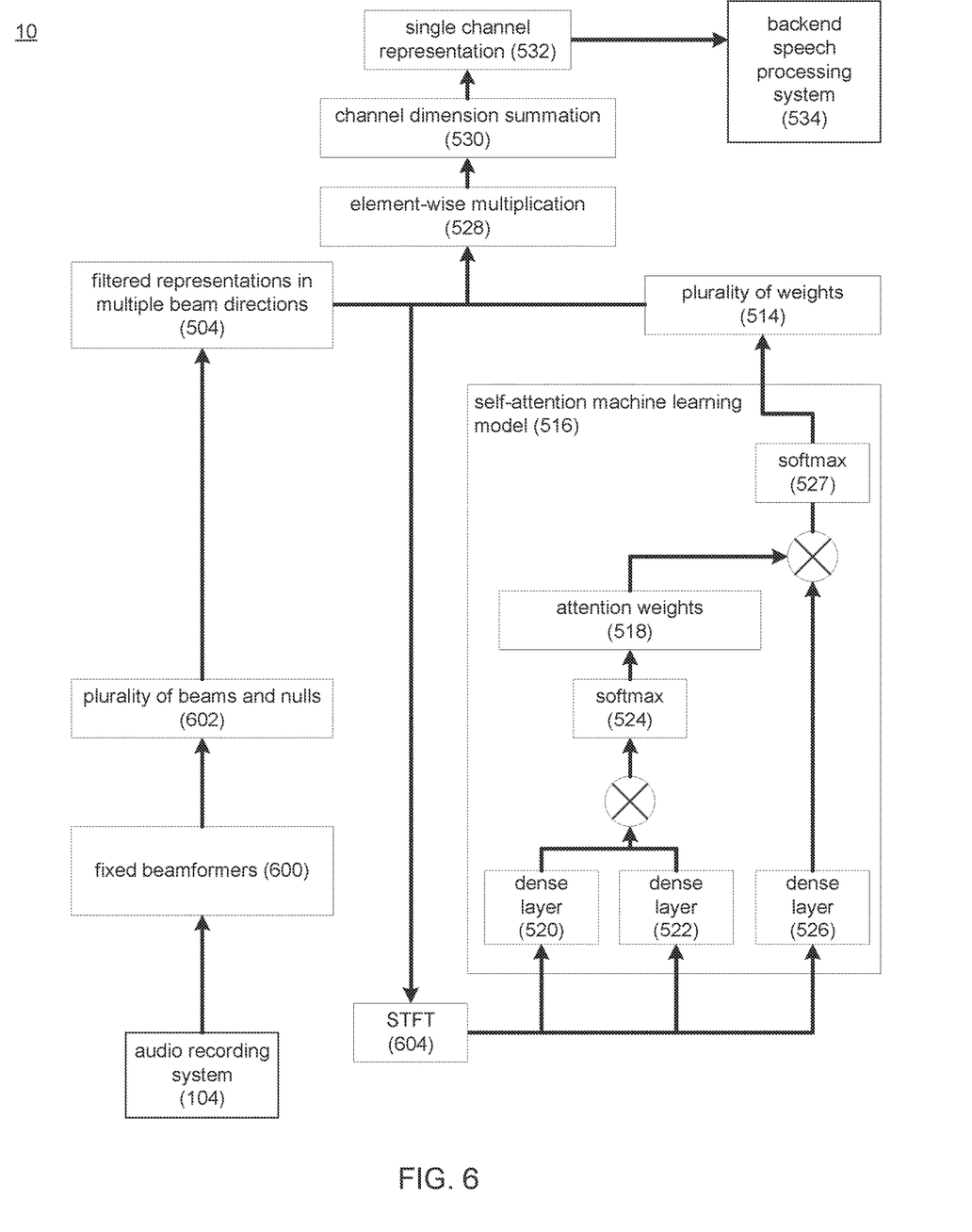

In some implementations, generating 402 the weighted multichannel representation of the plurality of channels may include generating 414 the weighted multichannel representation of the plurality of channels via a fixed beamformer. Referring also to FIG. 6, multichannel combining process 10 may generate 414 the weighted multichannel representation of the plurality of channels (e.g., weighted multichannel representation 504) using one or more fixed beamformers (e.g., fixed beamformers 600). As is known in the art, fixed beamformers 600 may include filter and sum beamformer, designed with some assumptions based on the nature of the noise and the room characteristics. The overall design of fixed beamformers 600 may be based on the well-known Minimum Variance Distortionless Response (MVDR) beamformer or a frequency-independent gain design.

When the one or more fixed beamformers (e.g., fixed beamformers 600) is based on the MVDR design, a steering vector (i.e., a set of phase shifts that must be applied to produce constructive interference in the direction of the source) and a noise covariance matrix (e.g., whose inverse is used to construct filters that improve the signal-to-noise ratio (SNR)) may be utilized. There are various options for steering vectors: ideal phase shifts; shifted sinc room impulse responses (RIRs); and/or actual RIRs (e.g., measured or simulated). There are also various options for noise covariance: identity (i.e., equivalent to the assumption of uncorrelated noise); spherically isotropic diffuse noise (typical of an ambient room scenario); and actual noise (e.g., measured or simulated). While examples have been provided for both the steering vectors and the noise covariance, it will be appreciated that these are for example purposes only and that any type of steering vector and/or noise covariance may be utilized within the scope of the present disclosure.

In some implementations, the one or more fixed beamformers (e.g., fixed beamformers 600) may be configured to direct beams and/or nulls toward certain locations/directions. This may be beneficial when there is a known speaker or noise source in a certain position relative to the microphone array. It may also be useful when suppressing sounds from a certain position (i.e., receiving speech from one speaker while attenuating speech from another speaker in a different position within a monitored space).

The one or more fixed beamformers (e.g., fixed beamformers 600) may combine the plurality of channels into a plurality of beams and/or nulls (e.g., plurality of beams and nulls 602) by altering the magnitude and the phase components. As is known in the art, a beam may generally include a pattern of constructive interference among microphones of a microphone array that is generated by modifying the phase and/or amplitude of the signal at each microphone of the microphone array via a plurality of filters. The pattern of constructive interference may improve the signal processing performance of the microphone array. Similarly, a null may generally include a pattern of destructive interference among microphones of a microphone array that is generated by modifying the phase and/or amplitude of the signal at each microphone of the microphone array. The pattern of destructive interference may limit the reception of signals by the microphone array.

The one or more fixed beamformers (e.g., fixed beamformers 600) may include a plurality of filters configured to alter the magnitude and/or phase of the plurality of channels for specific signal-based criteria. The plurality of filters of the one or more fixed beamformers (e.g., fixed beamformers 600) may be configured to generate particular beam and/or null patterns (e.g., plurality of beams and nulls 602). The beam design of the one or more fixed beamformers (e.g., fixed beamformers 600) may be data independent, which may be desirable when there is less field data available but may be less ideal if there is a lot of representative field data. As shown in FIGS. 5-6, the weighted multichannel representation (e.g., weighted multichannel representation 504) may be generated 402 using a self-attention machine learning model (e.g., self-attention machine learning model 502) and/or one or more fixed beamformers (e.g., fixed beamformers 600). As shown in FIG. 6, the weighted multichannel representation for one or more fixed beamformers (e.g., fixed beamformers 600) may be represented as filtered representations in multiple beam directions (e.g., filtered representations in multiple beam directions 504).

Generating the weighted multichannel representation of the plurality of channels via the one or more fixed beamformers may include defining 416 a plurality of attention weights corresponding to one or more sound sources. For example and as discussed above, the plurality of filters of the one or more fixed beamformers (e.g., fixed beamformers 600) may be configured to generate particular beam and/or null patterns (e.g., plurality of beams and nulls 602). Accordingly, the plurality of filters may define a plurality of attention weights that correspond to the direction of one or more sound sources. For example and as shown in FIG. 3, the plurality of filters may define a plurality of attention weights that correspond to the direction of one or more sound sources (e.g., encounter participant 226, encounter participant 228, and/or encounter participants 230 and 234). While an example of e.g., three encounter participants have been described as sound sources, it will be appreciated that any number of sound sources.

Multichannel combining process 10 may utilize 418 the plurality of attention weights corresponding to the one or more sound sources for various speech processing purposes (e.g., automated speech recognition, speaker localization, speaker diarization, etc.). For example as discussed above, the plurality of filters of the one or more fixed beamformers (e.g., fixed beamformer 600) may define a plurality of attention weights that correspond to the direction of one or more sound sources (e.g., encounter participant 226, encounter participant 228, and/or encounter participants 230 and 234). Multichannel combining process 10 may utilize 418 the plurality of attention weights corresponding to the one or more sound sources for speaker diarization and/or speaker localization for one or more speakers (e.g., encounter participant 226, encounter participant 228, and/or encounter participants 230 and 234). While examples of utilizing 418 the plurality of attention weights corresponding to the one or more sound sources for speaker diarization and speaker localization have been provided, it will be appreciated that these are for example purposes only and that multichannel combining process 10 may utilize 418 the plurality of attention weights for various speech processing applications within the scope of the present disclosure.

In some implementations, multichannel combining process 10 may generate 404 a plurality of weights for each channel of the plurality of channels based upon, at least in part, the weighted multichannel representation of the plurality of channels. Referring again to FIGS. 5-6, multichannel combining process 10 may utilize the weighted multichannel representation of the plurality of channels (e.g., weighted multichannel representation 504) to generate 404 a plurality of weights for each channel of the plurality of channels. For example, multichannel combining process 10 may receive the weighed multichannel representation of the plurality of channels (e.g., weighted multichannel representation 504) as an input to generate 404 a plurality of channel combination weights as the output (e.g., plurality of weights 514). The plurality of weights (e.g., plurality of weights 514) may be the weighted sum of a frequency dimension contracted input. For example, multichannel combining process 10 may contract the frequency components of the weighted multichannel representation (e.g., weighted multichannel representation 504). As will be discussed in greater detail below, the plurality of weights (e.g., plurality of weights 514) may be used to weight particular channels of the weighted multichannel representation (e.g., weighted multichannel representation 504) to generate a single channel representation.

In some implementations, generating 404 the plurality of weights for each channel of the plurality of channels based upon, at least in part, the weighted multichannel representation of the plurality of channels may include generating 420 the plurality of weights for each channel of the plurality of channels based upon, at least in part, the weighted multichannel representation of the plurality of channels via a second self-attention machine learning model (e.g., second self-attention machine learning model 516). As discussed above, a self-attention machine learning model may generally be configured to represent which portions of the input are more important and less important for a particular application. For example, with the weighted multichannel representation (e.g., weighted multichannel representation 504), the plurality of channels may be represented as linear combinations of the plurality of channels. However, the weighted multichannel representation may include a plurality of channels as opposed to a single channel representation needed for conventional backend speech processing. Accordingly, the second self-attention machine learning model (e.g., second self-attention machine learning model 516) may define a plurality of weights (e.g., plurality of weights 514) to apply to the weighted multichannel representation (e.g., weighted multichannel representation 504) to generate a single channel representation of the plurality of channels that includes the most important features for speech processing.

As discussed above with the first self-attention machine learning model (e.g., first self-attention machine learning model 502), generating the plurality of weights for each channel of the plurality of channels may include defining a plurality of attention weights. For example, a plurality of attention weights (e.g., attention weights 518) may be defined in a similar manner as discussed above relative to the plurality of attention weights of the first self-attention machine learning model. The query and key may be calculated separately by performing linear transformations on a STFT input of the weighted multichannel representations (e.g., result of processing represented by block 604). As shown in FIGS. 5-6, two "dense" layers (e.g., dense layers 520, 522) may be neural network components for performing linear transformations to calculate the query (e.g., via dense layer 520) and to calculate the key (e.g., via dense layer 522). Multichannel combining process 10 may take the softmax of the tensor multiplication between the "query" and "key" (e.g., where taking the softmax is represented by block 524 of FIGS. 5-6). As discussed above, second self-attention machine learning model 516 may receive the weighted multichannel representation of the plurality of channels (e.g., weighted multichannel representation 504) as input. Second self-attention machine learning model 516 may process weighted multichannel representation 504 to define a frequency dimension contracted representation of weighted multichannel representation 504 (e.g., via dense layer 526).

With the plurality of attention weights (e.g., attention weights 518) and the frequency dimension contracted representation of weighted multichannel representation 504 (e.g., generated via dense layer 526), multichannel combining process 10 may generate the plurality of weights (e.g., plurality of weights 514) as a weighted sum of the frequency dimension contracted representation of weighted multichannel representation 504 by performing a softmax of the product of the plurality of attention weights (e.g., plurality of attention weights 518) and the weighted multichannel representation 504 (e.g., generated via dense layer 526). The softmax is represented by block 527 of FIG. 5. In this manner, the plurality of weights (e.g., plurality of weights 514) may indicate which portions of the weighted multichannel representation of the plurality of channels to emphasize and/or de-emphasize in a single channel representation of the plurality of channels.

In some implementations, multichannel combining process 10 may generate 406 a single channel representation of the plurality of channels based upon, at least in part, the weighted multichannel representation of the plurality of channels and the plurality of weights generated for each channel of the plurality of channels. For example, multichannel combining process 10 may perform an element-wise multiplication of the weighted multichannel representation (e.g., weighted multichannel representation 504) and the plurality of weights (e.g., plurality of weights 514) which is represented in FIGS. 5-6 as block 528. Multichannel combining process 10 may then perform summation operations on the result of the element-wise multiplication to generate 406 a single channel representation (e.g., single channel representation 532) of the weighted multichannel representation (e.g., where the channel dimension summation is represented as block 530 in FIGS. 5-6).

In some implementations, multichannel combining process 10 may provide 422 the single channel representation of the plurality of channels to a backend speech processing system. As discussed above, backend speech processing systems (e.g., backend speech processing system 534) are usually designed to receive a single channel audio input. Accordingly, by generating 406 the single channel representation of the plurality of channels (e.g., single channel representation 532) as described above, a frontend speech processing system may receive multichannel audio and emit a single channel audio that may be utilized to bridge the gap between the multichannel audio input and a backend speech processing system (e.g., backend speech processing system 534). By providing 422 the single channel representation of the plurality of channels (e.g., single channel representation 532), conventional backend speech processing systems configured to process single channel inputs may be utilized without requiring any changes or modifications.

In some implementations, the combination of the frontend speech processing system and the backend speech processing system may define an end-to-end speech processing system. Multichannel combining process 10 may update the learnable weights by the joint training of the frontend and backend speech processing systems using multichannel audio signals and target tokens. These weights may be fixed during speech processing (e.g., recognition inference of an end-to-end ASR system).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   receiving a plurality of signals from a plurality of microphones, thus defining a plurality of channels;
   generating a weighted multichannel representation of the plurality of channels via one or more fixed beamformers, wherein generating the weighted multichannel representation includes defining a plurality of attention weights that correspond to a direction of one or more sound sources using a first self-attention machine learning model and multiplying the plurality of attention weights by the plurality of channels;
   generating a plurality of weights for each channel of the plurality of channels based upon, at least in part, the weighted multichannel representation of the plurality of channels via a second self-attention machine learning model includes:
      defining a frequency dimension contracted representation of the weighted multichannel representation, and
      generating the plurality of weights as a weighted sum of the frequency dimension contracted representation of the weighted multichannel representation by performing a softmax of a product of the plurality of attention weights and the weighted multichannel representation; and
   generating a single channel representation of the plurality of channels for processing by a backend speech processing system based upon, at least in part, the weighted multichannel representation of the plurality of channels and the plurality of weights generated for each channel of the plurality of channels.

2. The computer-implemented method of claim 1, wherein generating the weighted multichannel representation of the plurality of channels includes defining each channel of the weighted multichannel representation of the plurality of channels as a linear combination of the plurality of channels.

3. The computer-implemented method of claim 1, further comprising: utilizing the plurality of attention weights corresponding to the direction of the one or more sound sources for speech processing.

4. A computer program product residing on a non-transitory computer readable medium having a plurality of instructions stored thereon which, when executed by a processor, cause the processor to perform operations comprising:
   receiving a plurality of signals from a plurality of microphones, thus defining a plurality of channels;
   generating a weighted multichannel representation of the plurality of channels via one or more fixed beamformers, wherein generating the weighted multichannel representation includes defining a plurality of attention weights that correspond to a direction of one or more sound sources using a first self-attention machine learning model and multiplying the plurality of attention weights by the plurality of channels;
   generating a plurality of weights for each channel of the plurality of channels based upon, at least in part, the weighted multichannel representation of the plurality of channels via a second self-attention machine learning model includes:
      defining a frequency dimension contracted representation of the weighted multichannel representation, and
      generating the plurality of weights as a weighted sum of the frequency dimension contracted representation of the weighted multichannel representation by performing a softmax of a product of the plurality of attention weights and the weighted multichannel representation; and
   generating a single channel representation of the plurality of channels for processing by a backend speech processing system based upon, at least in part, the weighted multichannel representation of the plurality of channels and the plurality of weights generated for each channel of the plurality of channels.

5. The computer program product of claim 4, wherein generating the weighted multichannel representation of the plurality of channels includes defining each channel of the weighted multichannel representation of the plurality of channels as a linear combination of the plurality of channels.

6. The computer program product of claim 4, wherein the operations further comprise:
   utilizing the plurality of attention weights corresponding to the direction of the one or more sound sources for speech processing.

7. A computing system comprising:
   a memory; and
   a processor configured to receive a plurality of signals from a plurality of microphones, thus defining a plurality of channels, wherein the processor is further configured to generate a weighted multichannel representation of the plurality of channels via one or more fixed beamformers, wherein generating the weighted multichannel representation includes defining a plurality of attention weights that correspond to a direction of one or more sound sources using a first self-attention machine learning model and multiplying the plurality of attention weights by the plurality of channels, wherein the processor is further configured to generate a plurality of weights for each channel of the plurality of channels based upon, at least in part, the weighted multichannel representation of the plurality of channels via a second self-attention machine learning model includes: defining a frequency dimension contracted representation of the weighted multichannel representation, and generating the plurality of weights as a weighted sum of the frequency dimension contracted representation of the weighted multichannel representation by performing a softmax of a product of the plurality of attention weights and the weighted multichannel representation, and wherein the processor is further configured to generate a single channel representation of the plurality of channels for processing by a backend speech processing system based upon, at least in part, the weighted multichannel representation of the plurality of channels and the plurality of weights generated for each channel of the plurality of channels.

8. The computing system of claim 7, wherein generating the weighted multichannel representation of the plurality of channels includes defining each channel of the weighted multichannel representation of the plurality of channels as a linear combination of the plurality of channels.

* * * * *